United States Patent
Wang

(10) Patent No.: US 11,631,918 B2
(45) Date of Patent: Apr. 18, 2023

(54) VENTILATING CONTAINER

(71) Applicant: Nan Ya Plastics Corporation, Taipei (TW)

(72) Inventor: Kuei-Yung Wang, Taipei (TW)

(73) Assignee: NAN YA PLASTICS CORPORATION

( * ) Notice: Subject to any disclaimer, the term of this patent is extended or adjusted under 35 U.S.C. 154(b) by 0 days.

(21) Appl. No.: 17/838,424

(22) Filed: Jun. 13, 2022

(65) Prior Publication Data

US 2022/0344768 A1 Oct. 27, 2022

Related U.S. Application Data

(60) Provisional application No. 63/338,497, filed on May 5, 2022.

(51) Int. Cl.
| | |
|---|---|
| *H01M 50/30* | (2021.01) |
| *H01M 50/204* | (2021.01) |
| *H01M 50/383* | (2021.01) |
| *H01M 10/658* | (2014.01) |
| *H01M 50/291* | (2021.01) |
| *H02J 7/00* | (2006.01) |

(52) U.S. Cl.
CPC ......... *H01M 50/30* (2021.01); *H01M 10/658* (2015.04); *H01M 50/204* (2021.01); *H01M 50/291* (2021.01); *H01M 50/383* (2021.01); *H02J 7/0013* (2013.01); *H02J 7/0042* (2013.01); *Y02E 60/10* (2013.01)

(58) Field of Classification Search
CPC .. H01M 50/30; H01M 10/658; H01M 50/291; H01M 50/204; H01M 50/383; H01M 50/209; H01M 50/244; H01M 50/264; H01M 50/262; H01M 10/6561; H01M 10/6566; H01M 10/6562; H01M 10/6563; H01M 10/656; H02J 7/0013; H02J 7/0042; Y02E 60/10
See application file for complete search history.

(56) References Cited

U.S. PATENT DOCUMENTS

| | | | |
|---|---|---|---|
| 2003/0211384 A1* | 11/2003 | Hamada | H01M 10/647 429/120 |
| 2012/0052358 A1* | 3/2012 | Tan | H01M 10/658 429/120 |
| 2018/0175465 A1* | 6/2018 | Choi | H01M 50/20 |

\* cited by examiner

*Primary Examiner* — Lingwen R Zeng
(74) *Attorney, Agent, or Firm* — Ostrolenk Faber LLP

(57) ABSTRACT

A ventilating container for containing a plurality of energy storage units, comprises a container body defining a storage area; and a ventilating panel securing to the container body and defining a storage space within the storage area for supporting the energy storage units. The ventilating panel encloses an air passage which connects an air inlet to a plurality of air outlets, the air outlets being distributed at designated positions on at least one side of the ventilating panel for ventilating said energy storage units.

30 Claims, 19 Drawing Sheets

VENTILATING CONTAINER

The present application claims priority to U.S. Provisional Application Ser. No. 63/338,497, filed on May 5, 2022, the entire disclosure of which is incorporated by this reference.

FIELD OF INVENTION

The present invention relates to a ventilating container for example particularly, but not exclusively, a ventilating container for containing one or more energy storage units.

BACKGROUND OF THE INVENTION

Conventionally, rechargeable batteries are columned together in a storage container with an air conditioner installed. The heat dissipation rate is different at different parts of the container attributable to the arrangement of the batteries and the position of the air conditioner. Heat convection within the container is unsatisfactory. Narrow gaps between batteries are poorly ventilated. Heat dissipation is uneven. Batteries closer to the air conditioner are usually better ventilated than those placed further away from the air conditioner. As a result, the air conditioner must operate continuously at a high energy consumption rate to maintain a sufficient temperature gradient so as to compensate the poor ventilation by enhancing the rate of heat exchange. The energy consumption of such container is always high. When for some reasons the air conditioner fails to perform at a required standard to maintain the temperature gradient, the temperature within the container will rise quickly. Unless the air conditioner is able to bring down the temperature in the container within a short period of time, the batteries and the electronics stored in the container may be damaged.

The invention seeks to eliminate or at least to mitigate such shortcomings for enhanced performance by providing a new or otherwise improved ventilating container.

SUMMARY OF THE INVENTION

According to a first aspect of the invention, there is provided a ventilating container for containing a plurality of energy storage units, comprising a container body defining a storage area; and a ventilating panel securing to the container body and defining a storage space within the storage area for supporting the energy storage units; wherein the ventilating panel encloses an air passage which connects an air inlet to a plurality of air outlets, the air outlets being distributed at designated positions on at least one side of the ventilating panel for ventilating said energy storage units. Preferably, the storage space is partitioned into two or more storage sections for storing energy storage units. More preferably, the air inlet is in fluid communication with an air blower that drives air into the air passage via the air inlet. Preferably, the ventilating panel encloses a conduit for running of electrical wires. More preferably, wherein the air passage and the conduit are embedded within a filler that fills interior of the ventilating panel. It is preferable that the ventilating panel is equipped with supports for removably supporting said energy storage units. Preferably, wherein at least one of the supports is positioned in proximity to a respective air outlet and provided on a same side of the ventilating panel as the air outlet. It is preferable that the ventilating panel includes a pair of oppositely arranged ventilating panel parts, with the air outlets on at least one of the ventilating panel parts being open to the storage space for ventilating said energy storage units in the storage space. More preferably, at least one of supports includes first and second support parts that function as a pair for removably supporting a respective energy storage unit, with the first support part provided on one of the two ventilating panel parts and the second support part provided on the other ventilating panel part at a position corresponding to the position of the first support part.

In a preferred embodiment the first support part has an air guide that directs air exiting an adjacent air outlet to move in a preset course. More preferably, at least one of the supports is equipped with a friction reducing member to facilitate removal of a respective energy storage unit. Advantageously, the storage space is partitioned widthwise into two or more storage sections by a further said ventilating panel part positioned between the pair of ventilating panel parts, for accommodating said energy storage units in different storage sections. More advantageously, the air inlet is in fluid communication with an air blower which is provided at a top portion of at least one of the storage sections and atop a stack of energy storage units in that storage section. More advantageously, the further ventilating panel part has two opposing sides, one side being equipped with a said first support part of one support and the other side being equipped with a said second support part of an adjacent support. Preferably, the further ventilating panel part encloses a passage way that connects at least one air inlet and a plurality of air outlets, the air outlets being located on at least one side of the further ventilating panel part at predetermined positions and are open to one of the storage sections on said one side. More preferably, the storage space is divided height wise by one or more said supports into storage zones for supporting respective energy storage units. Yet more preferably, each air outlet is open to an associated storage zone for diverting air into the storage zone. It is advantageous that each of the supports extends transversely to the ventilating panel part and is positioned adjacent to an associated air outlet.

It is preferable that at least one of the storage sections is divided heightwise by one or more said supports into storage zones for supporting two or more said energy storage units in the storage section. More preferably, the container body includes a frame structure for locating the ventilating panel. Yet more preferably, the frame structure is equipped with a holder for holding the ventilating panel in position in the storage area. It is preferable that the holder includes a pair of holder parts for engaging different parts of the ventilating panel, the holder parts cooperating to hold the ventilating panel in position. Preferably, the frame structure supports a plurality of side walls to define the storage area that contains the ventilating panel.

It is preferable that the ventilating container further including an air conditioner in fluid communication with the air blower. Preferably, the filler comprises a fire-proof material or a thermal-resistant material or a combination thereof. It is advantageous that the ventilating container includes a walkway in the storage area for accessing said energy storage units.

In a second aspect of the invention there is provided a ventilating container assembly comprising at least two of the ventilating containers as detailed above, wherein each ventilating container is equipped with a coupler for coupling with an adjacent ventilating container.

In a third aspect of the invention there is provided a ventilating container for containing a plurality of energy storage units, comprising: an air source; a container body defining a storage area in fluid communication with the air source; a ventilating panel securing to the container body and defining a storage space within the storage area for containing said energy storage units; and a guided air passage that fluidly communicates the air source to the storage space for delivering air in a controlled manner to ventilate said energy storage units. Preferably, the guided air passage includes an air passage embedded in the ventilating panel, a air path on a support that extends from and transverse to the ventilating panel, and a guided air pathway on at least one of said energy storage units. More preferably, in combination with a plurality of said energy storage units, wherein at least one of the energy storage units includes a guided air pathway that extends immediately adjacent and over a majority of a principal surface of the energy storage unit for heat dissipation. It is preferable that the guided air pathway extends over the whole of the principal surface of the energy storage unit. More preferably, the energy storage unit includes at least one fin or fin-like protrusion on its principal surface to define the guided air pathway. Yet more preferably, air enters the air path on the support from at least two air sources, the air is guided to leave the support via a same exit. It is preferable that direction of airflow in the air path is opposite that on the principal surface of the energy storage unit.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 15:
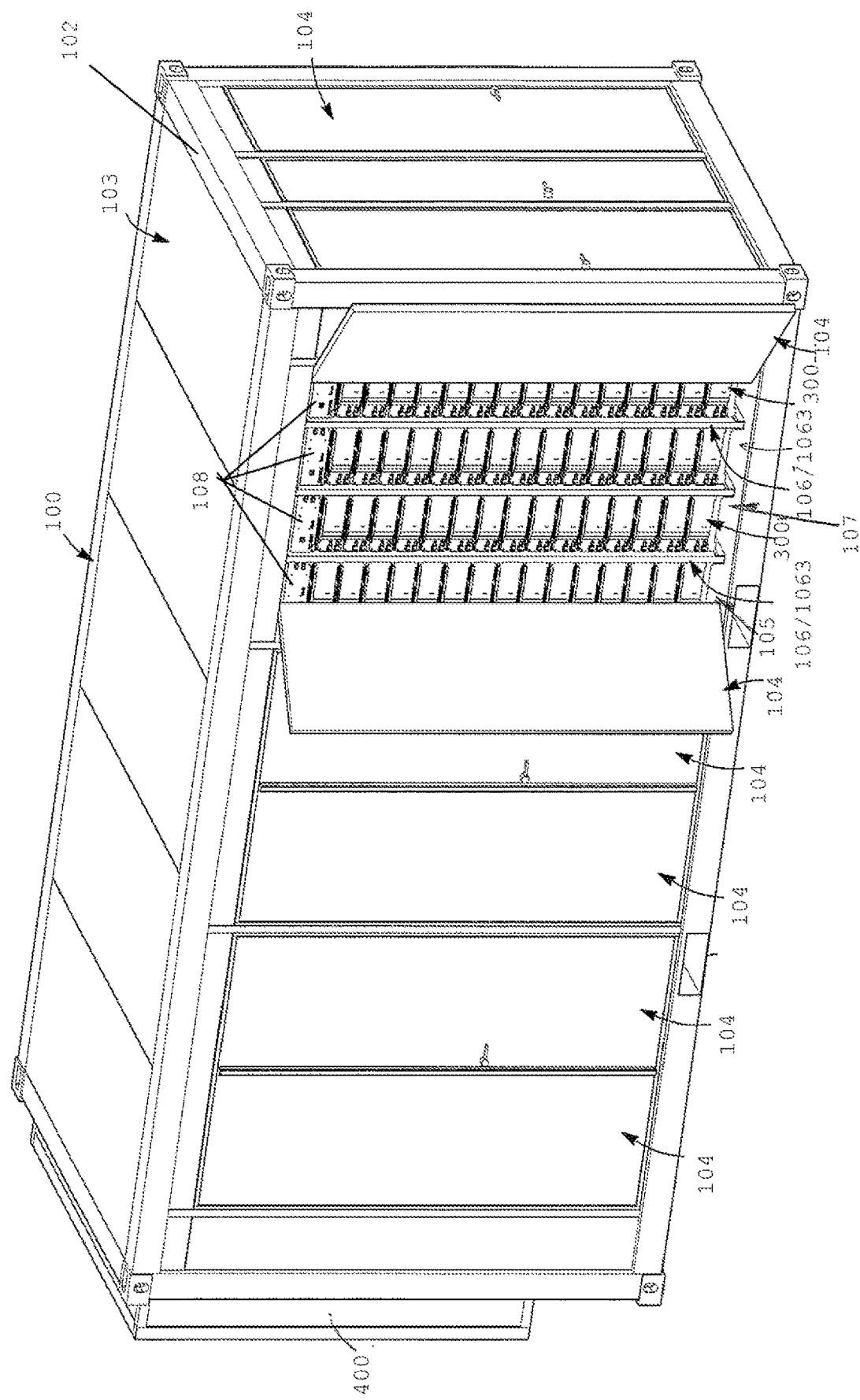
FIG. 15 is schematic drawing, of a second embodiment of the ventilating container at different perspectives.
Figure 16:
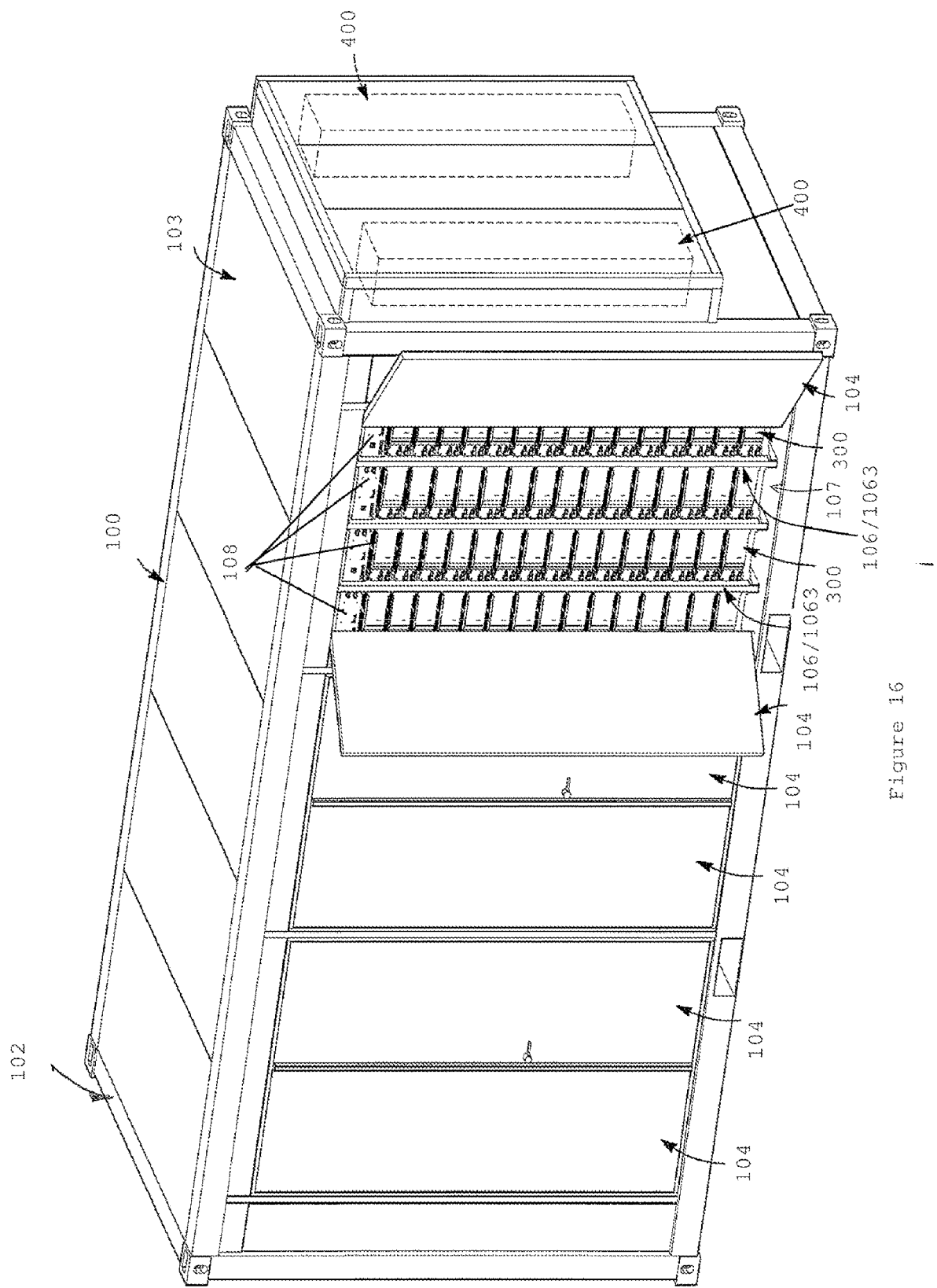
FIG. 16 is a top plan view of the second embodiment of the ventilating container with an upper side panel.
Figure 17:
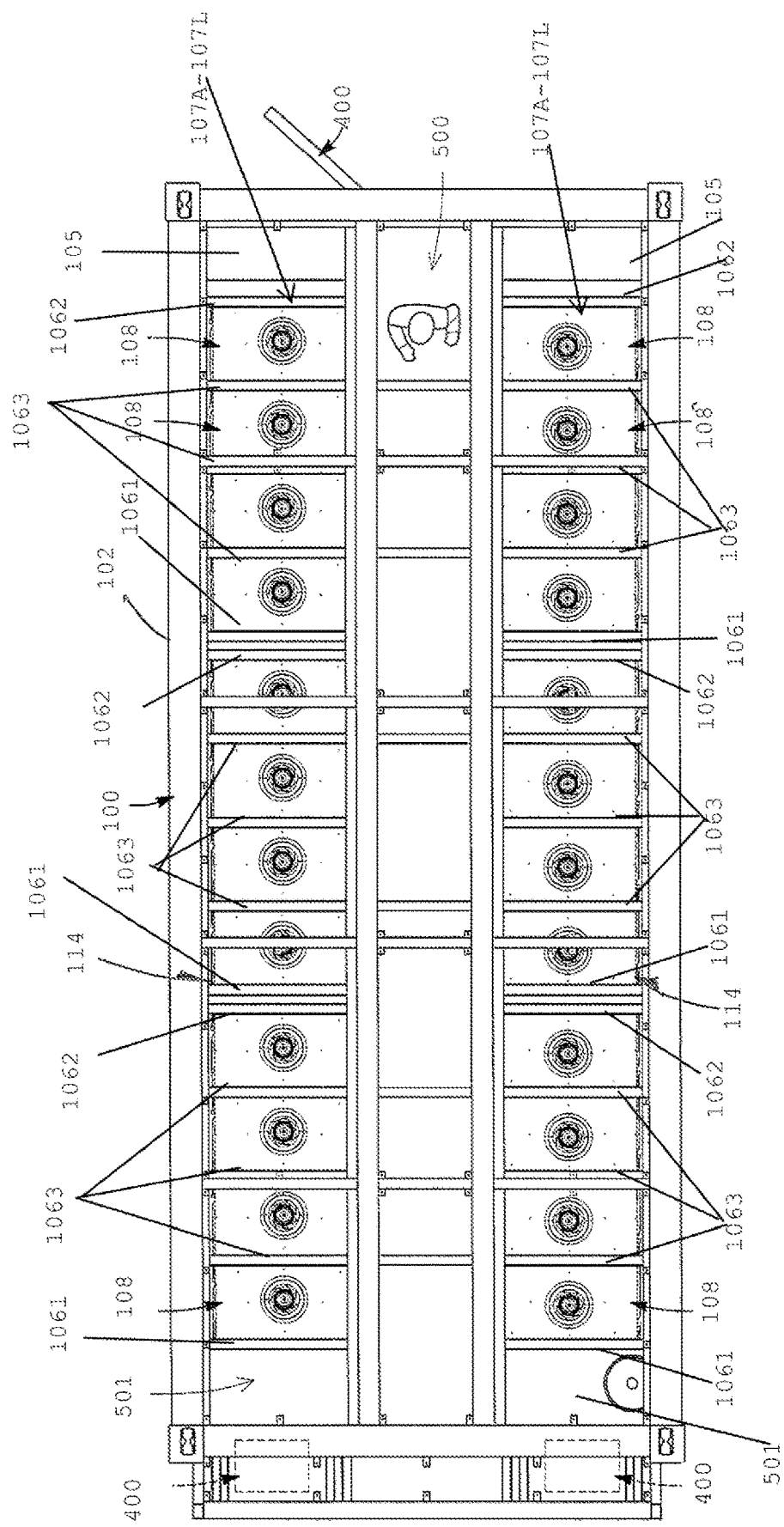
FIG. 17 is a schematic drawing of the second embodiment of the ventilating container with top part being removed.
Figure 18:
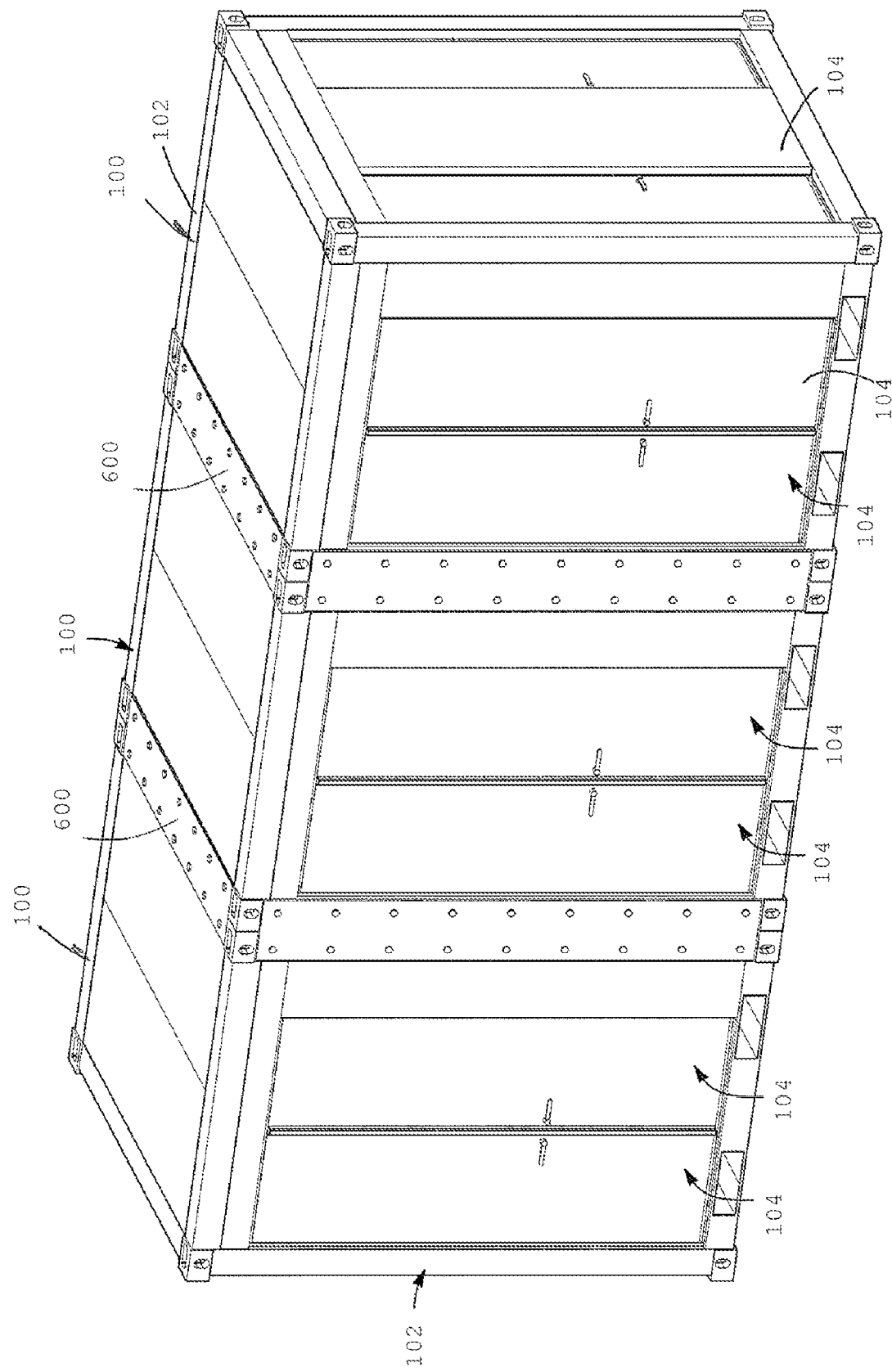
FIG. 18 is a schematic drawing of the third embodiment of the ventilating container with door closed.

In FIGS. 1 to 19 there are shown three embodiments of a ventilating container 100 in accordance with the invention. FIGS. 1 to 14 show a first embodiment, FIGS. 15 to 17 show a second embodiment and FIG. 18 shows a third embodiment. The main differences between these embodiments are the position of air conditioner/air source 200 and the scale of the ventilating container 100.

In each of these embodiments, there is shown a ventilating container 100 defining a storage area for containing a number of energy storage units 300. These energy storage units 300 emit heat during operation and it is of paramount importance that the heat get dissipated because the accumulation of heat around the energy storage units 300 will cause damage and undermine their performance.

The ventilating container 100 includes a container body 101 which has a frame structure 102 that supports six side walls 103 and a pair of openable door 104. A storage area 105 is defined by the six side walls 103, the openable door 104, and the frame structure 102. Inside the storage area 105, there is at least one ventilating panel 106 secured to the frame structure 102 of the container body 101. The ventilating panel 106 defines a storage space 107 inside of the storage area for accommodating one or more energy storage units 300. The storage space 107 may be partitioned into two or more storage sections 107A and 107B depending on needs.

The ventilating panel 106 includes at least two ventilating panel parts 1061/1062. In other words, the ventilating panel part 1061 forms the ventilating panel 106, which encloses an air passage 106A that connects at least one air inlet 106B and at least one air outlets 106C. The air inlet and outlet 106B and 106C are provided on the ventilating panel 106/ventilating panel parts 1061/1062. They may be on the same side or on different sides of the ventilating panel 106/ventilating panel parts 1061/1062. Each of the air outlets 106C is opened to the storage space 107 at different predetermined position. The air inlet 106B of the ventilation panel 106/ventilating panel parts 1061/1062 is in fluid communication with a fan 108 that moves air into the air passage 106A via the air inlet 106B.

The ventilating panel 106/ventilating panel parts 1061/1062 also encloses a conduit 109 that connects at least one inlet 109A and at least one outlet 109B for running of wire to supply energy to for example the fan 108, the energy storage units 300. The conduit 109 and the air passage 106A are surrounded by or embedded within filler 115 that occupies most of the space within the ventilating panel 106. The filler material may be thermal insulating and/or fire proof such that the ventilating container 100 passes certain fire safety requirements.

Each ventilating panel 106/ventilating panel parts 1061/1062 is equipped with a support 110 for supporting an energy storage unit 300 or a fan 108. The support 110 is securely fastened onto the side of the ventilating panel 106/ventilating panel parts 1061/1062 where the air outlet 106C is situated. The support 110 extends transverse to the ventilating panel 106/ventilating panel parts 1061/1062. The support 110 is positioned adjacent to or in proximity of the air outlet 106C so that cold air coming from the air outlet reaches the energy storage unit 300 as soon as possible to minimize the chances of it being heated up by the environment. The support 110 has a first storage support part 110A for cooperating with a second storage support part 110B to movably support the energy storage unit 300. The energy storage unit 300 is slidably movable relative to both the first and second storage support parts 110A and 110B. The shape and/or configuration of the first storage support part 110A is different from that of the second storage support part 110B. The first storage support part 110A extends from and transversely to the ventilating panel part 1061 and the second storage support part 110B extends from and transversely to the ventilating panel part 1062.

Figure 1:
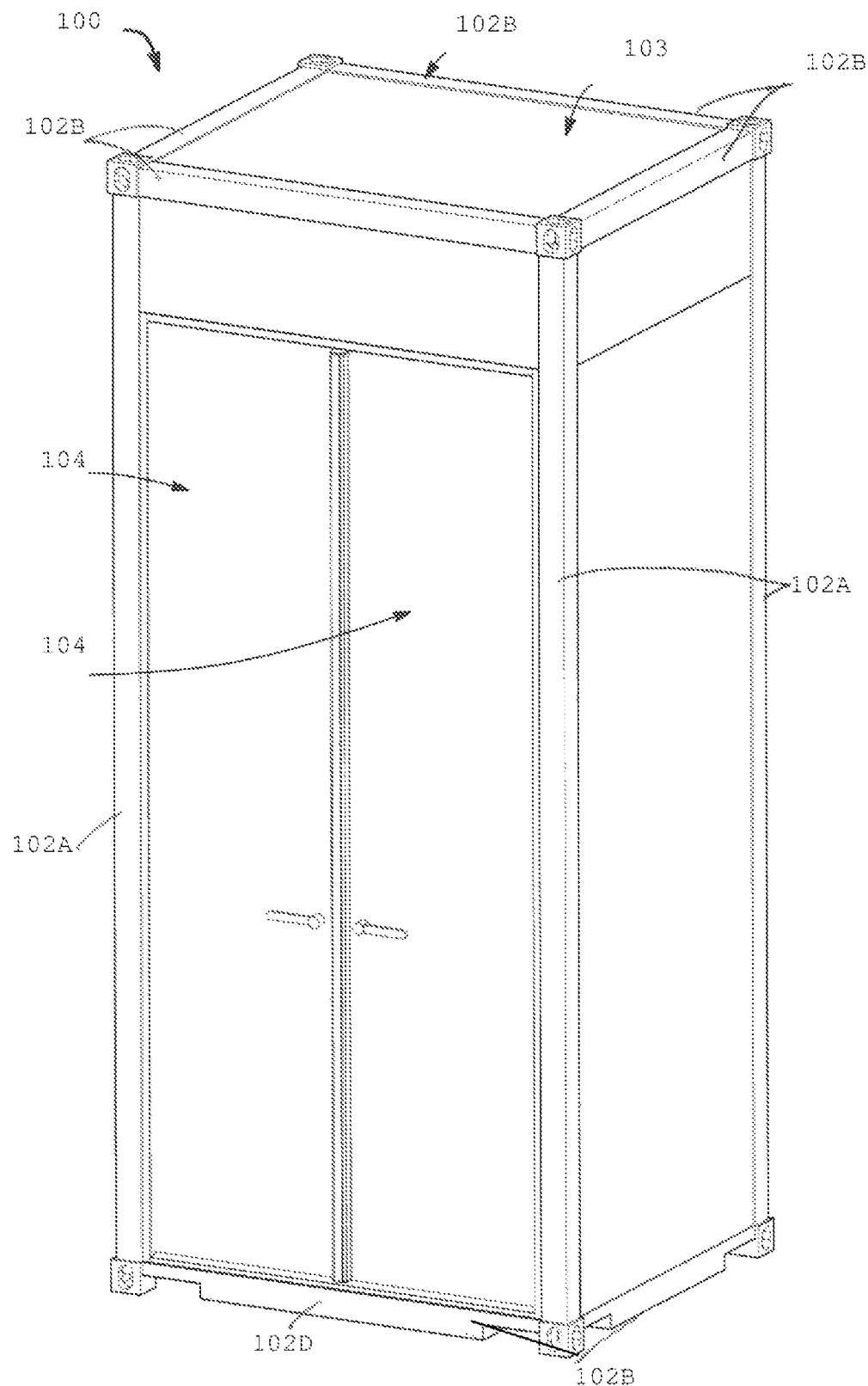
FIG. 1 and FIG. 2 are schematic diagrams showing a first embodiment of the ventilating container in different perspectives.
Figure 2:
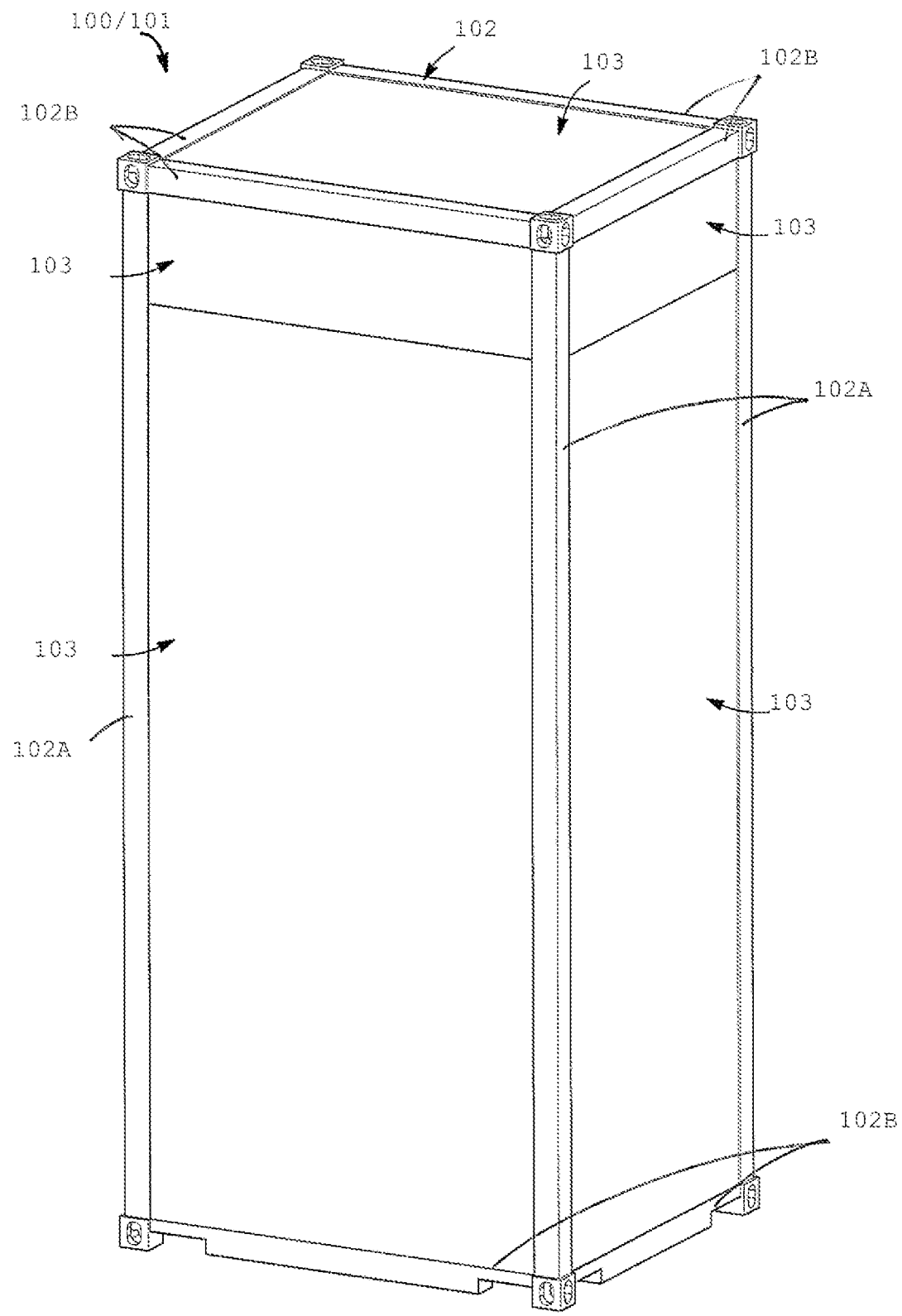
Figure 3:
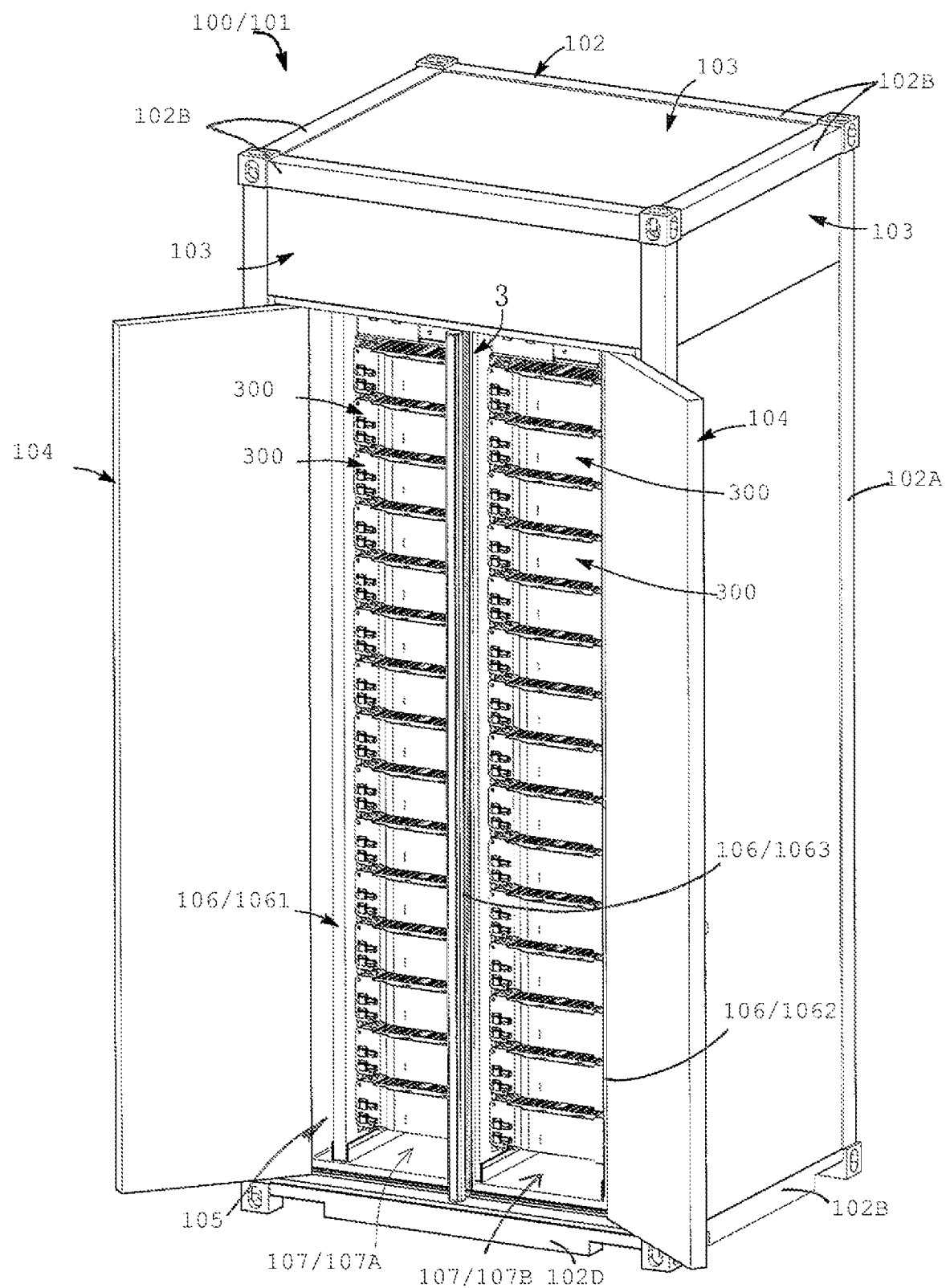
FIG. 3 is a schematic drawing of the first embodiment of the ventilating container with openable doors being opened.
Figure 4:
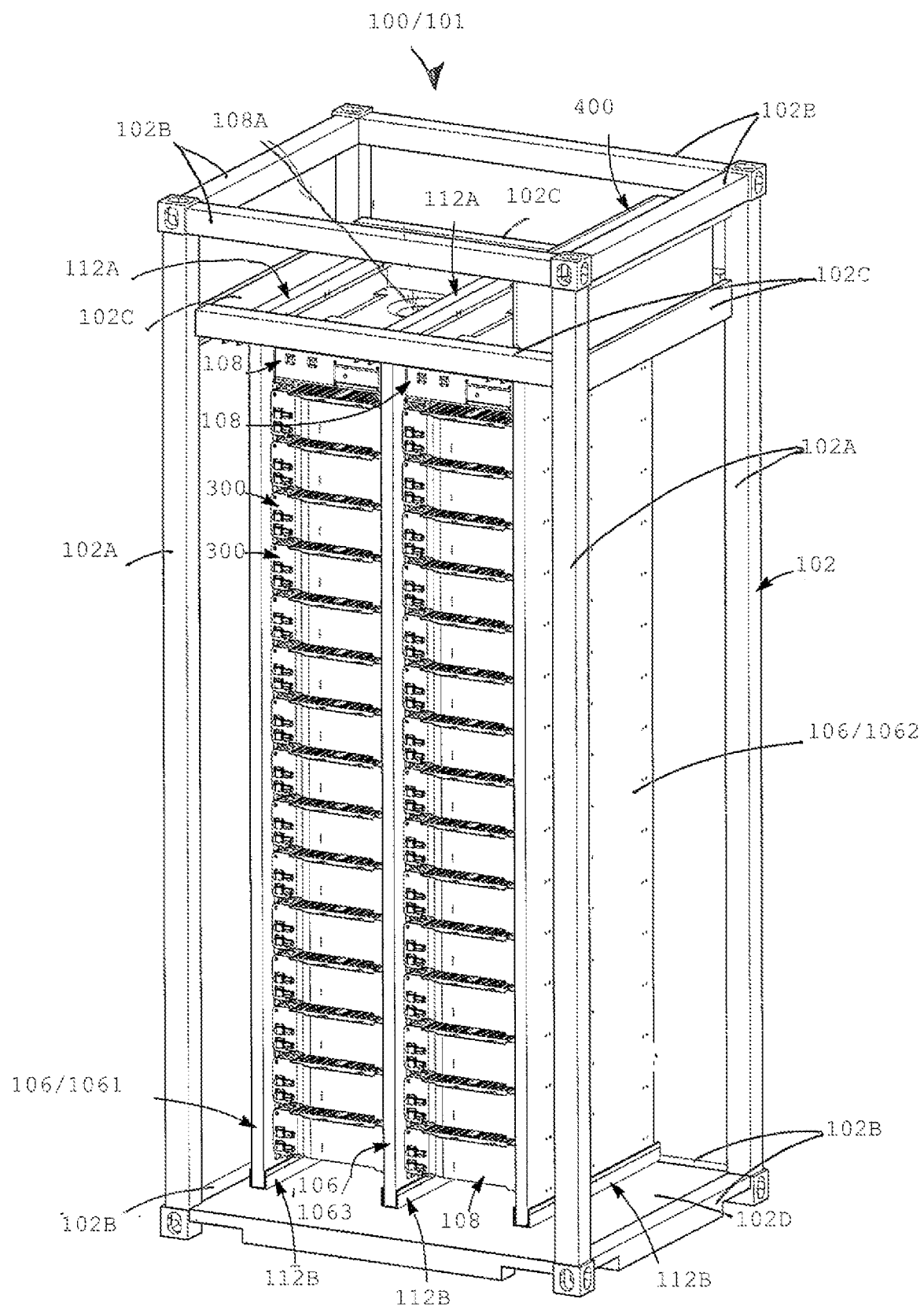
FIG. 4 and FIG. 5 are schematic drawings of the first embodiment of the ventilating container with a portion of the panel being omitted.
Figure 5:
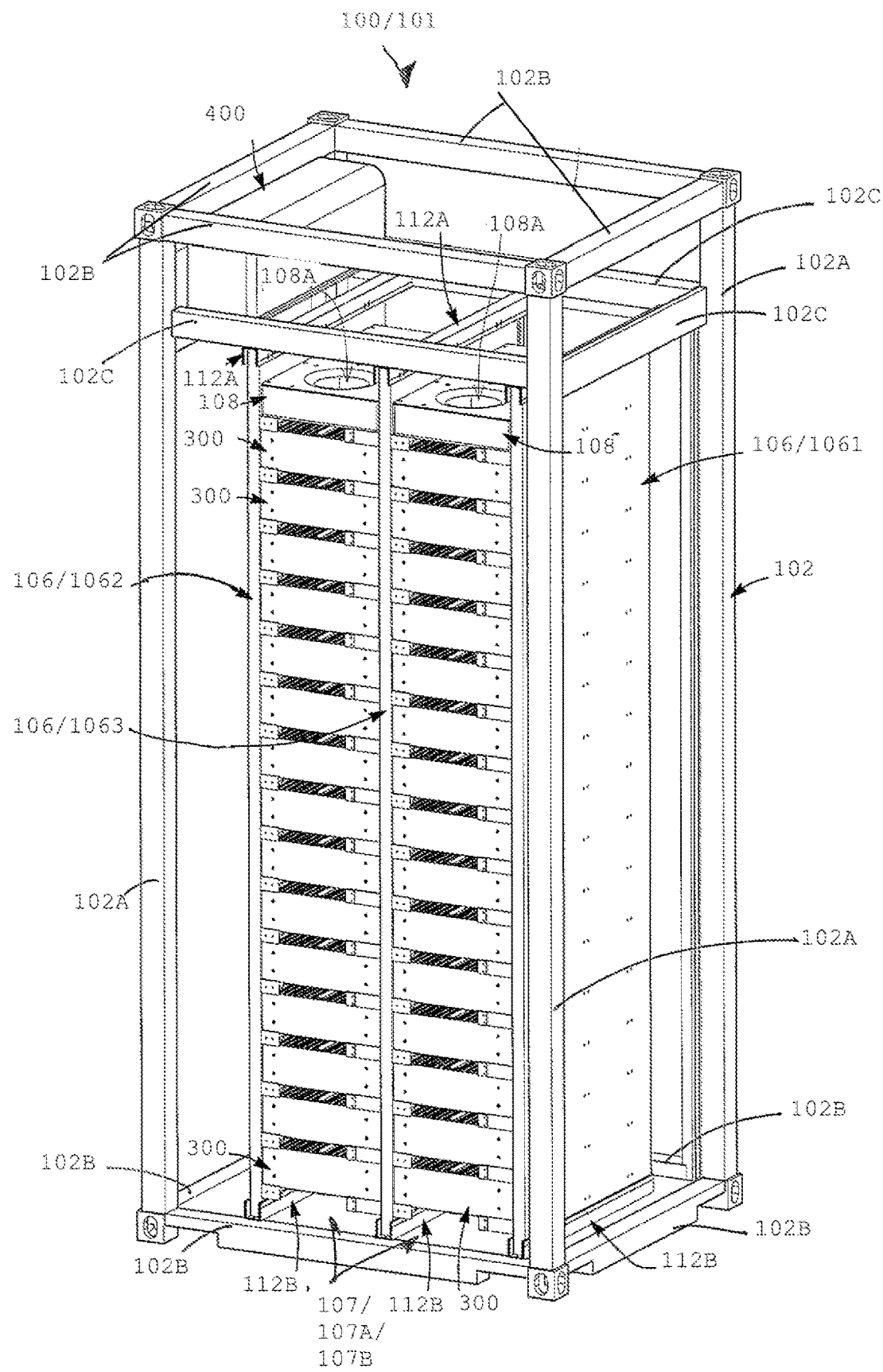

With reference to FIGS. 1 to 14, there is shown the first embodiment of the ventilating container 100. In this embodiment, with reference to FIGS. 1 and 2, the container body 101 is generally rectangular in shape. It has a frame structure 102 with frame members 102A to 102C, that holds a rectangular framework and supports six side walls 103, a pair of openable doors 104. One of the side walls 103 is actually a bottom tray 102D. The ventilating container 100 defines a storage area 105 in which a ventilating panel 106 is provided. The ventilating panel 106 is made up of two ventilating panel parts 1061 and 1062 and a further ventilating panel part 1063. With reference to FIGS. 3 to 5, These ventilating panel parts 1061/1062 together defines a storage space 107 within the storage area 105, which is partitioned along width by the further ventilating panel part 1063 into two storage sections 107A and 107B. These ventilating panel parts 1061, 1062 and 1063 are arranged in alignment. The supports 110 partition each of the storage sections 107A and 107B into a plurality of storage zones 113. Each zone 113 is dimensioned to hold one energy storage unit 300.

Figure 7:
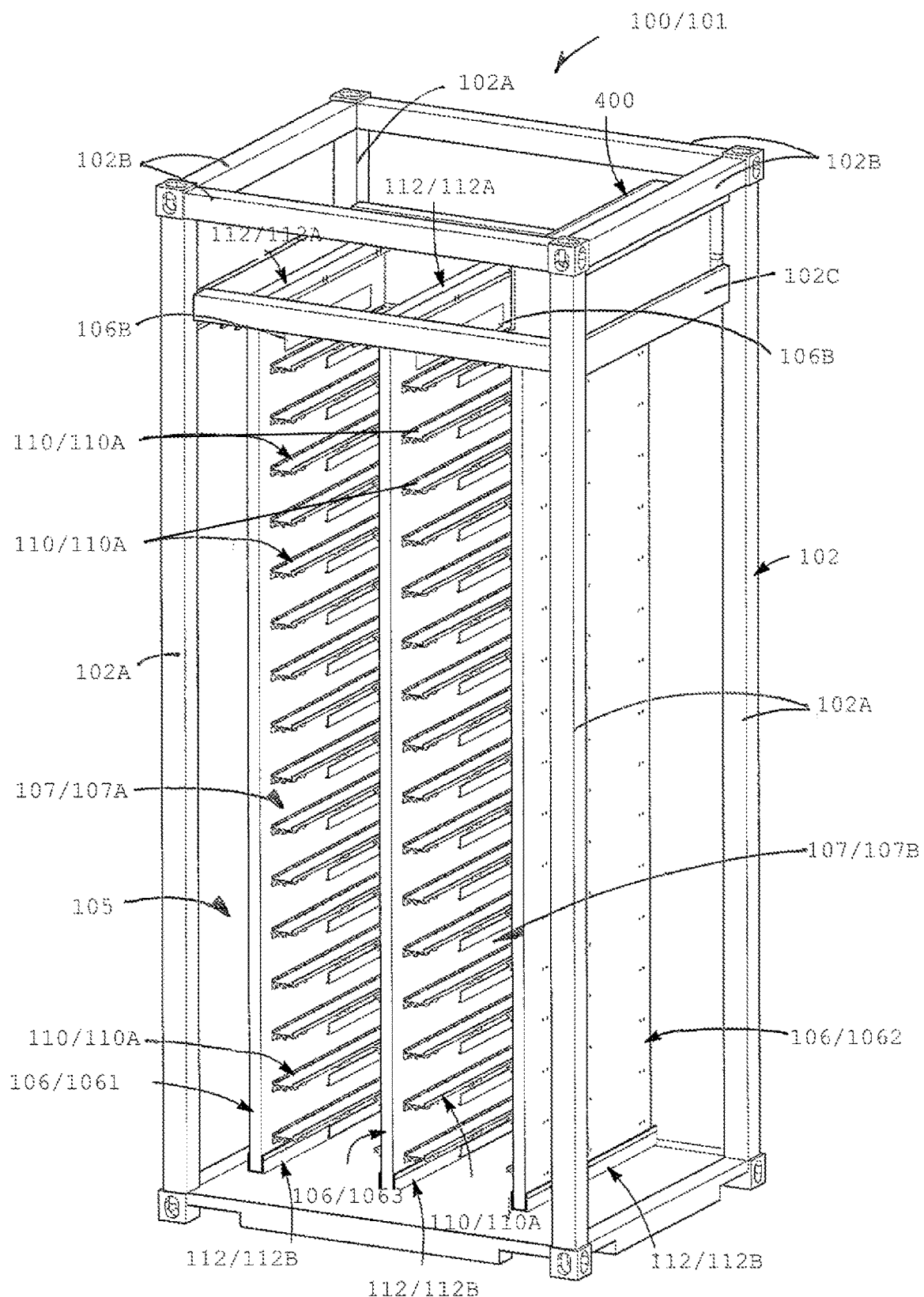
FIG. 7 is a schematic drawing of a frame structure, partition penal and support of the first embodiment of the ventilating container.
Figure 8:
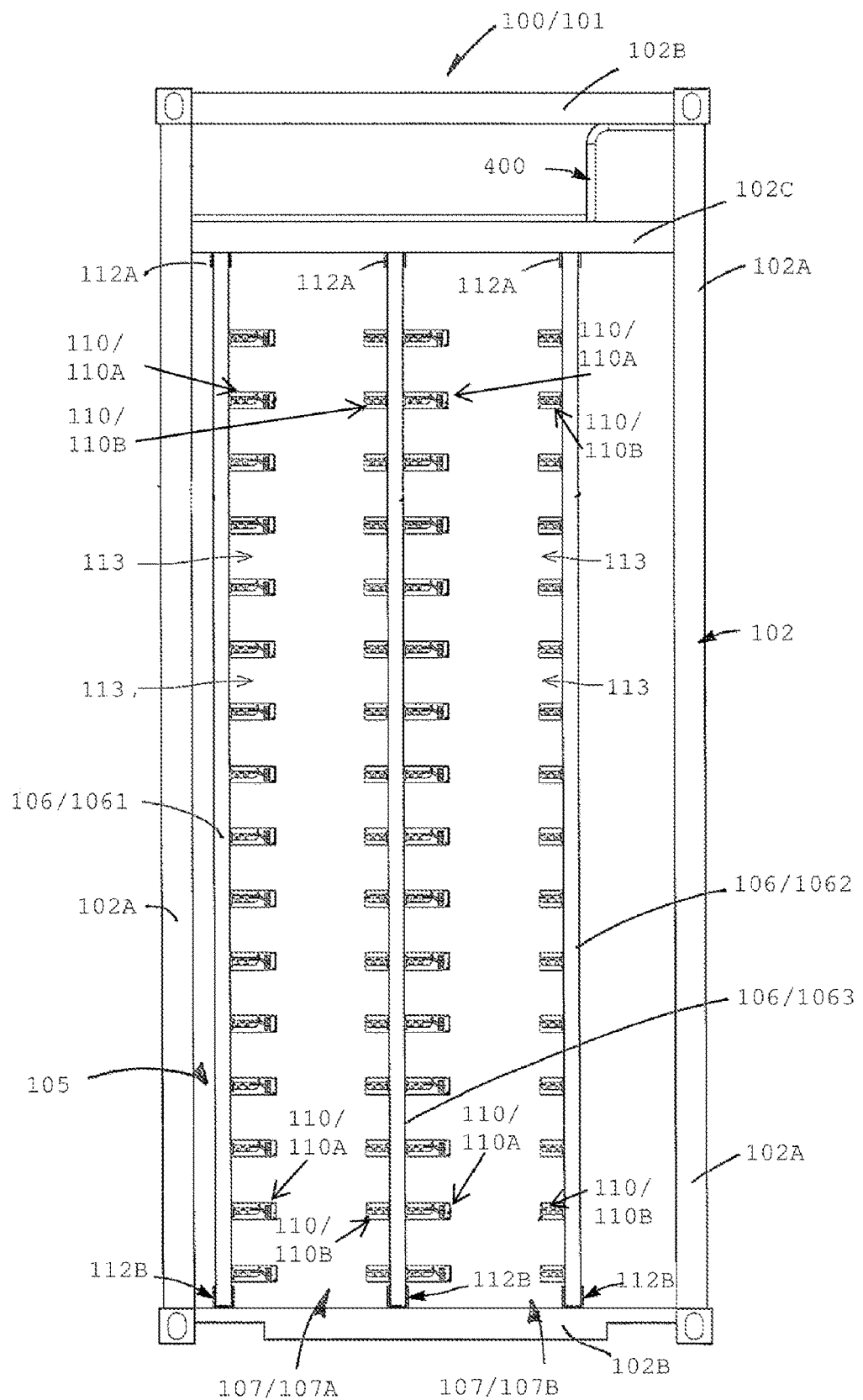
FIG. 8 is a front view of the ventilating container in FIG. 7.

As can be seen in FIGS. 7 and 8, the ventilating panel part 1061 is equipped with the first storage support parts 110A and the ventilation panel part 1062 is equipped with the second storage support parts 110B. These first and second storage support parts 110A and 110B extend into the respective storage sections 107A and 107B. These storage support parts 110A and 110B are elongated structures evenly distributed along height of the ventilating panel part 1061 and 1062. Air inlet 106B and outlets 106C are distributed on one side of the ventilating panel parts 1061 and 1062 and are evenly spaced along height of the ventilating pane parts 1061 and 1062. The storage support parts 110A is positioned adjacent to or in proximity to or immediately above respective the air outlets 106C on the ventilating panel parts 1061 so that cold air coming through will reach the storage support parts 110A, hence the energy storage units 300 shortly after it leaves the air outlets 106C. The support parts 110B are evenly distributed along height of the ventilating panel part 1062. The further ventilating panel part 1063 has two opposite sides facing respective storage sections 107A and 107B. The side facing the ventilating panel part 1061 is equipped with a plurality of second storage support parts 110B and the side facing the ventilating panel part 1062 is equipped with a plurality of first storage support parts 110A, air inlets 106A as well as air outlets 106B. The storage support parts 110A and 110B are distributed evenly along height of the further ventilating panel part 1063 and are basically arranged back to back except that they are not physically touching one another. The first storage support parts 110A on the ventilating panel part 1061 cooperate with the second storage support parts 110B on the further ventilating panel part 1063 for movably supporting a plurality of energy storage units 300 into a column in one storage section 107A. The second storage support parts 110B on the ventilating panel part 1062 cooperate with the first storage support parts 110A on the further ventilating panel part 1063 for movably support another column of energy storage units 300 in the other storage section 107B. In this embodiment, two storage sections 107A and 107B each contains a column of energy storage units 300. As can be seen for example in FIGS. 11 and 12, the ventilating panel parts 1061, 1062 and 1063 are structurally the same and have fixture apertures that may be through holes extending along thickness of the ventilating panel part 1061/1062/1063 for coupling with the supports 110 on one or both of the opposite sides. Conventional couplers such as screws and nuts are used to fix the storage supports 110 to the ventilating panel parts 1061/1062/1063.

In a different embodiment, the first and second storage supports parts 110A and 110B on the ventilating panel pars 1061 and 1062 may cooperate with one another for supporting an energy storage unit 300 of the relevant size and shape.

Figure 12:
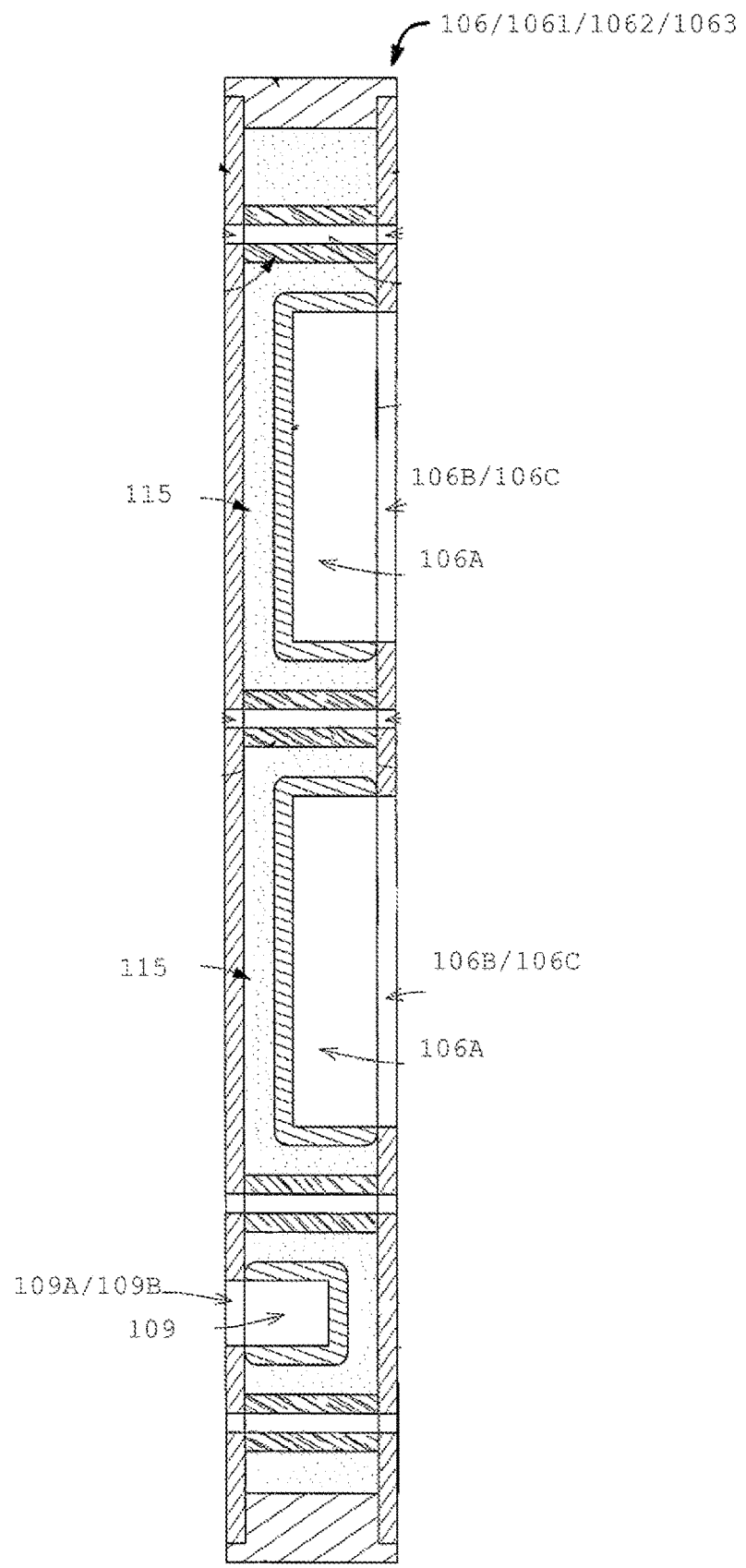
FIG. 12 is a sectional schematic drawing of the ventilating panel of the first embodiment of the ventilating container.
Figure 14:
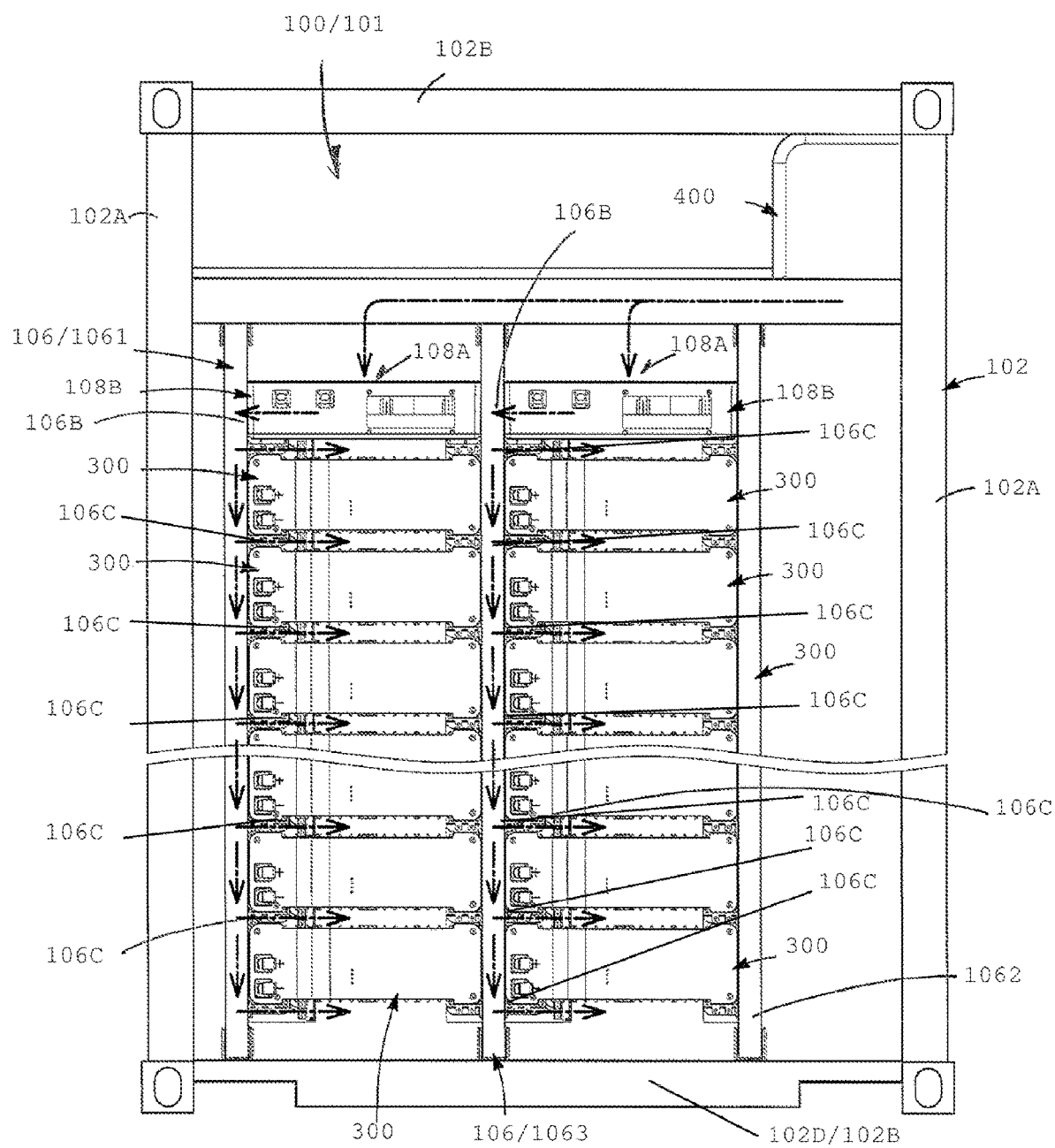
FIG. 14 is a cross-sectional schematic drawing of the first embodiment of the ventilating container with airflow.

With reference to FIGS. 12 and 14, each of these ventilating panel parts 1061, 1062 and 1063 encloses an air passage 106A that connects the air inlets 106B and the air outlets 106C. More specifically, the air inlets 106B is at the top of a series of air outlets 106C that are aligned one on top of the other along height of the ventilating panel parts 1061, 1062 and 1063. The air outlets 106C are evenly spaced and occupy respective predetermined positions on the ventilating panel parts 1061/1062/1063. There are two air passages 106A each connects to one air inlet 106B and a column of air outlets 106C. In each storage section 107A or 107B, there are two air inlets 106B arranged side by side and pairs of air outlets 106B arranged under the air inlets 106B one after the other. The storage sections 107A and 107B are partitioned along height into storage zones 113. In each storage zone 113, there are either a pair of air inlets 106B or a pair of air outlets 106C arranged side-by-side. These air inlets 106B and air outlets 106C are opened to the respective storage section 107A/107B or storage zones 113. The air inlet 106B is in fluid communication with the fan 108 that moves cold air from an air conditioner 200 into the air passage 106A. The cold air in the air passage 106A exits the ventilating panel parts 1061, 1062 and 1063 through the air outlets 106C.

Figure 6:
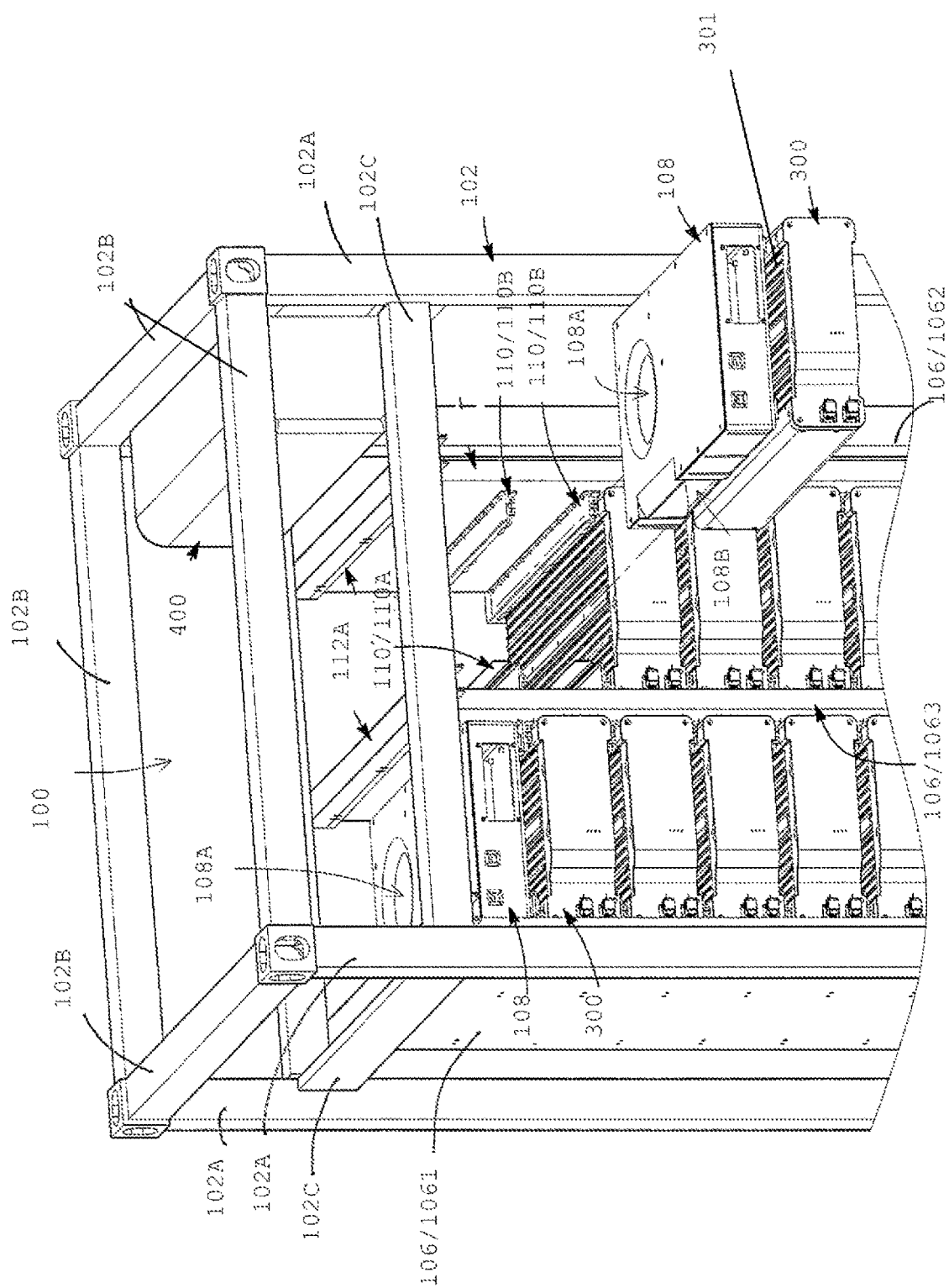
FIG. 6 is a part exploded schematic drawing of the first embodiment of the ventilating container.
Figure 9:
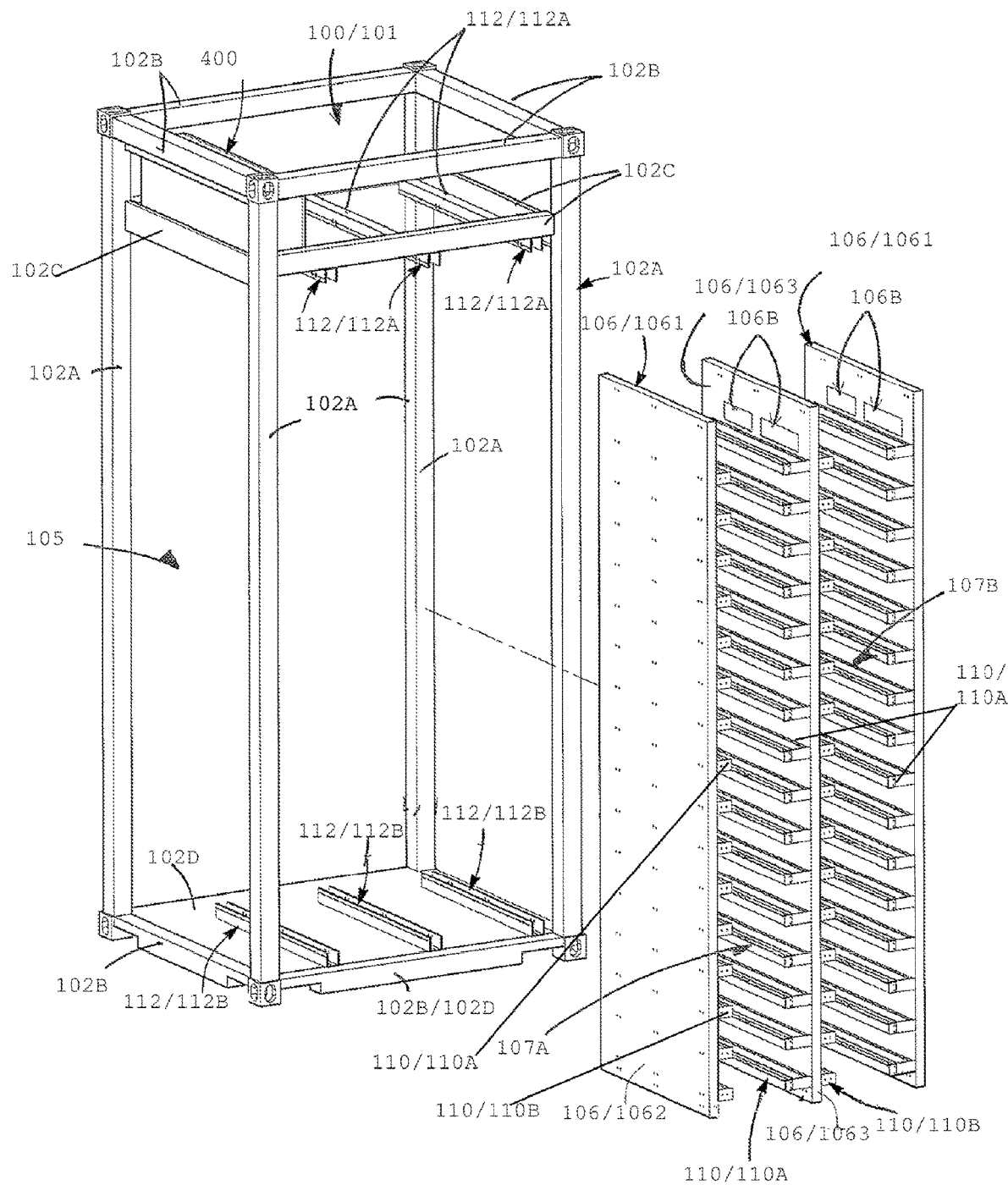
FIG. 9 is an exploded schematic drawing of the first embodiment of the ventilating container.
Figure 10:
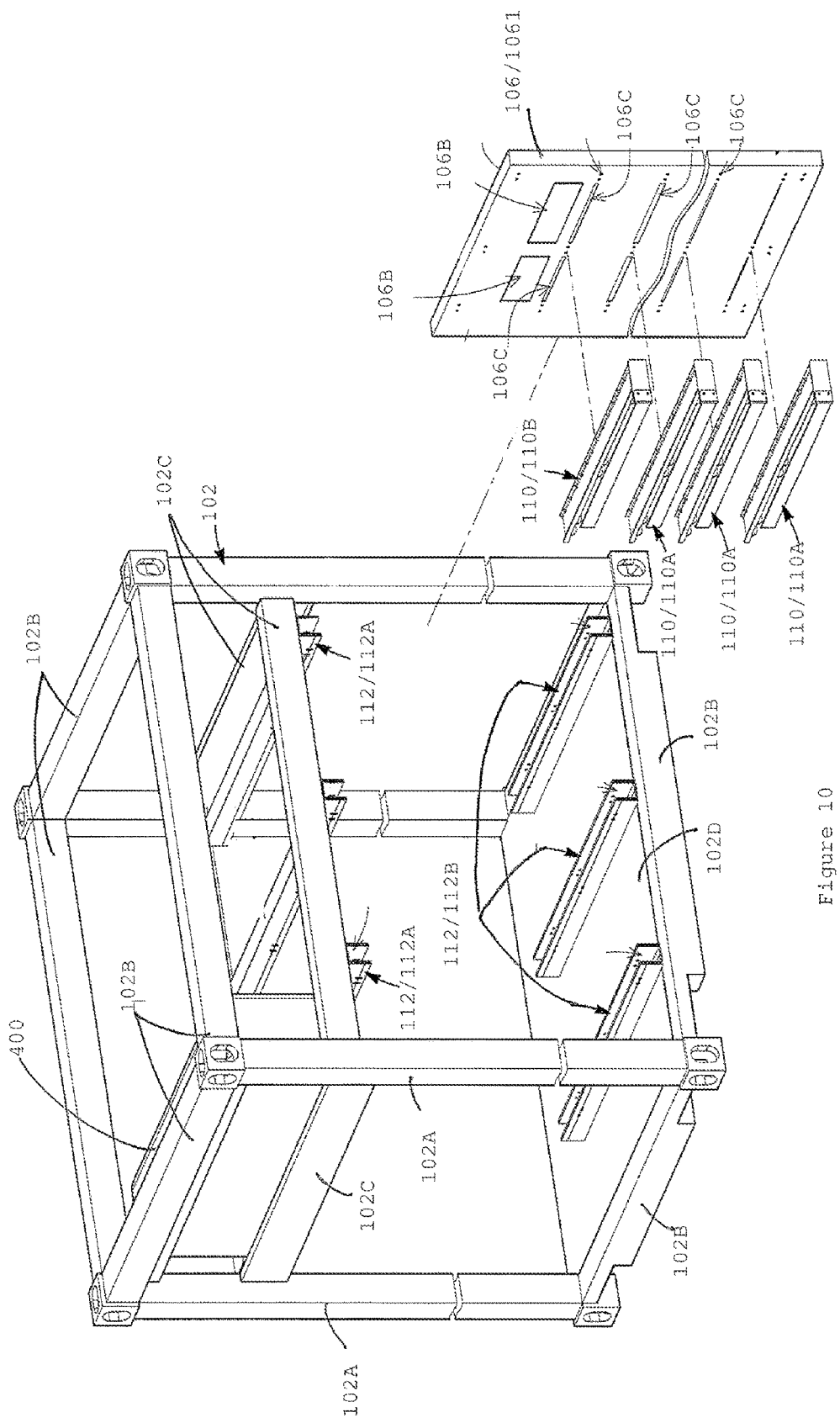
FIG. 10 is a exploded schematic drawings of part of the frame structure, ventilating panel and support of the first embodiment of the ventilating container.
Figure 11:
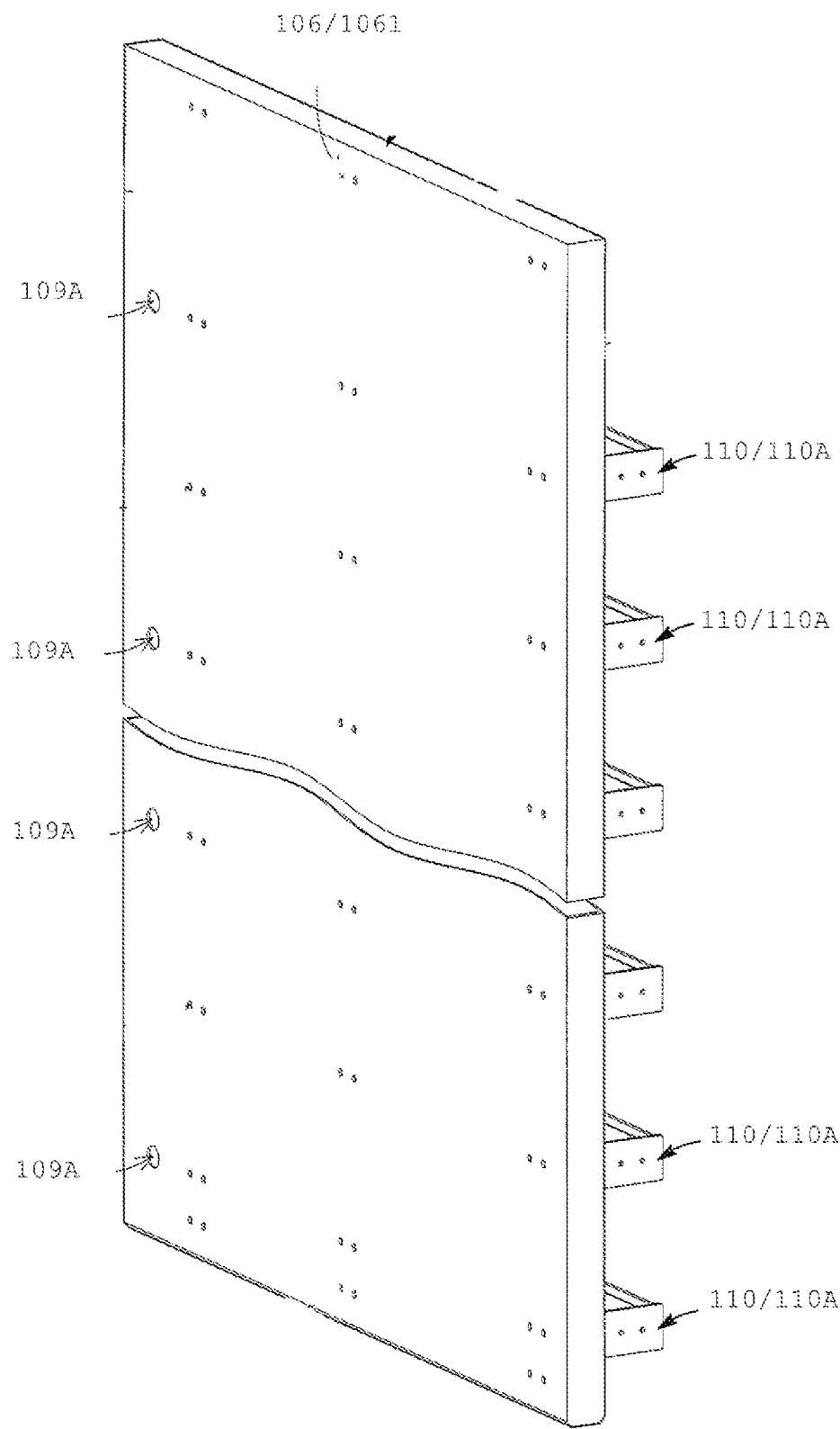
FIG. 11 is a schematic drawing of the ventilating panel of the first embodiment of the ventilating container viewed in a different perspective.

With reference to FIGS. 6, 9 and 10, the frame structure 102 is rectangular in shape with four vertical frame members 102A and eight horizontal frame members 102B which are arranged at the opposite ends of the vertical frame members 102A to form a rectangular frame. There are four horizontal beams 102C extending between the vertical frame members 102A to form a quadrilateral. The beams 102C are vertically displaced from the horizontal frame members 102B. The beams 102C are closer to upper four of the horizontal frame members 102B than lower four of the horizontal frame members. These beams 102C together with the upper four horizontal frame members 102B defines an upper portion of the container body 101 where the air conditioner 200 is placed. Holder 112 are provided on the frame structure 102 to hold the ventilation panel 106/ventilating panel parts 1061/1062/1063 in place. The holder includes holding parts 112A and 112B that are operated in pairs. In each pair of holding parts 112A and 112B, one holding part 112A spans across two opposite horizontal beams 102C and the other spans across two opposite lower horizontal frame members 102B which run parallel to the two opposite horizontal beams 102C. The holding parts 112A and 112B are configured to engage respective upper and lower ends of the ventilating panel 106/ventilating panel part 1061/1062/1063. Each of the holding parts 112A and 112B has an elongated U-shaped groove that accommodates the end of the ventilating panel 106/ventilating panel part 1061/1062/1063. The holding parts 112A is fixed to the beams 102C and the holding part 112B is fixed to a bottom tray 102D by welding or any other conventional ways.

The bottom tray 102D is supported by the lower horizontal frame member 102B. The ventilation panel parts 1061/1063 are removably coupled to the holding parts 112A and 112B by couplers such as screws and nuts or any conventional ways.

Figure 19:
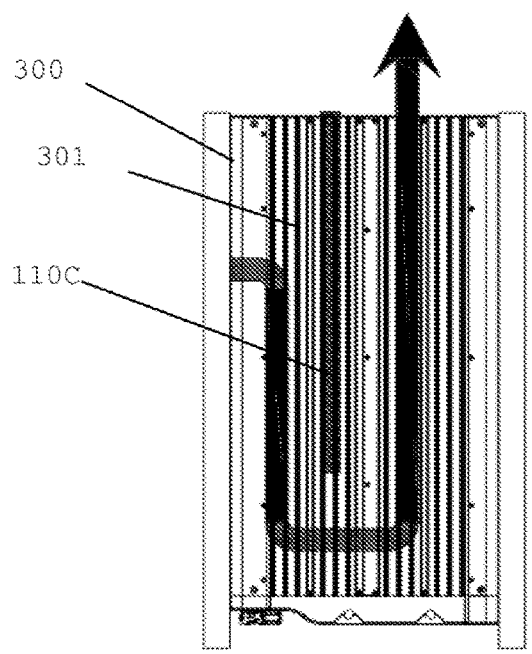
FIG. 19 is an illustrative drawing showing a second embodiment of a portion of a guided air passage which includes air path on a support and an air pathway on an energy storage unit.

As shown in FIG. 12 and with reference to FIG. 19, inside of the ventilating panel 106/ventilating panel part 1061/1062/1063, in addition to the air passage 106A, there is a conduit 109 that connects an inlet 109A and an outlet 109B for accommodating wire that connects the energy storage units 108 to an outside power source. The conduit 109 and the air passage 106A are also surrounded by or embedded within filler 115 that occupies the rest of the space within the ventilating panel 106. As mentioned previously, the filler material may be thermal insulating and/or fire proof.

Figure 13:
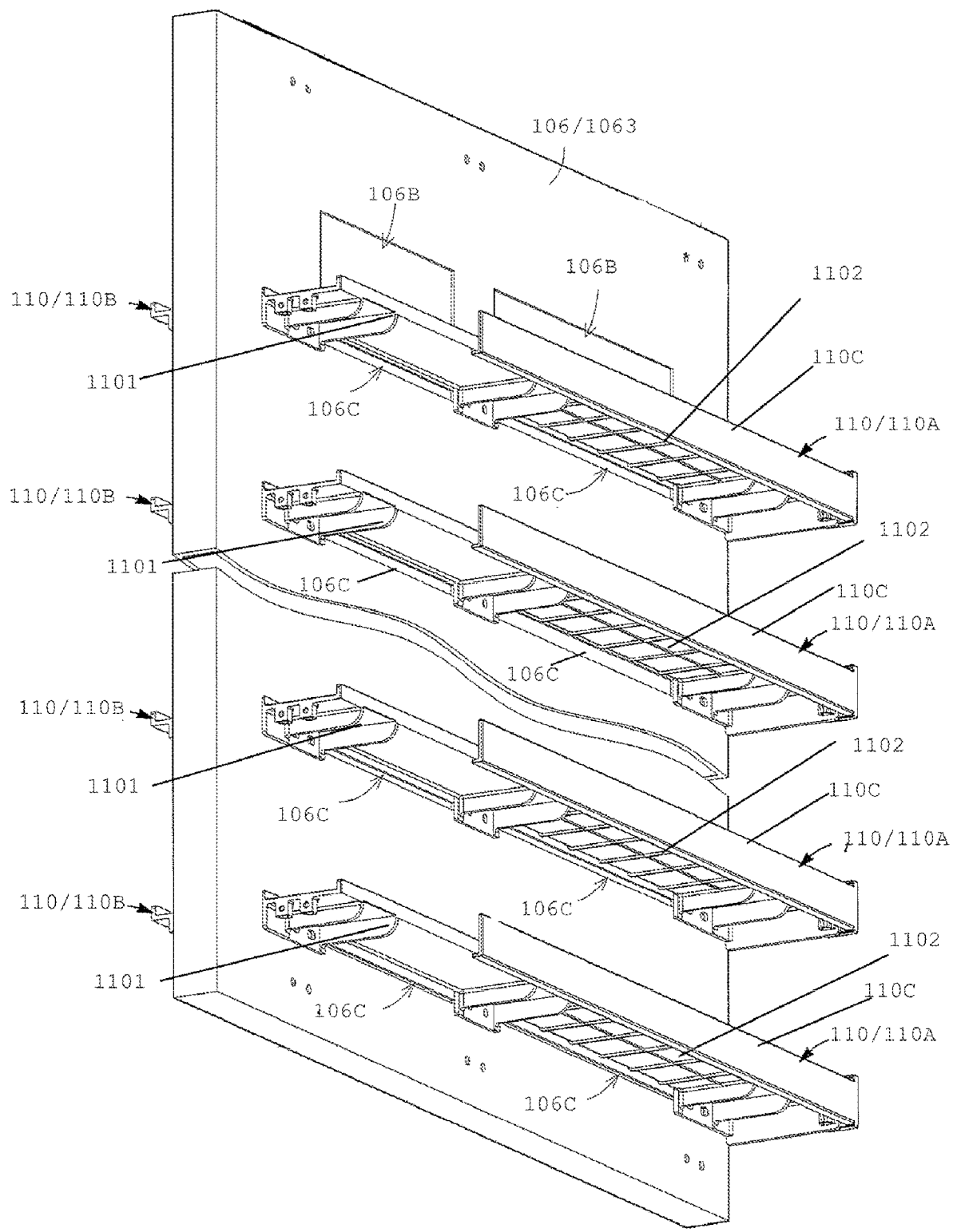
FIG. 13 is a front view of the first embodiment of the ventilating container without the openable door and it shows the first embodiment of a guided air passage.

FIGS. 9 and 13 show the first support part 110A which has a U-shaped cross-section when taken along length. The first support part 110A has a front portion and a rear portion 1101 and 1102. These portions 1101 and 1102 are integrally formed as one piece. The first support part 110A has an air guide 110C on its rear portion 1102 which is designed to guide air coming out of the air outlet 102C towards the front portion 1101. The air guide 110C is L-shaped which lines an outer periphery of the rear portion 1102. The air guide 110C does not cover the periphery of the front portion 1101 such that cold air may leave the first support part 110A via the front portion 1101 to the energy storage unit 300. The second support part 110B does not have an air guide. It has a width smaller than that of the first support part 110A. The structure and shape of the second support part 110B resemble that of the front portion 1101 of the first support part 110A.

The first and second support parts 110A and 110B may be equipped with friction reducing member such as wheels along length to facilitate movement of the energy storage unit 300 along the parts 110A and 110B. With reference to FIG. 13, the first support part 110A is provided adjacent to or in proximity to or immediately above a pair of air outlets 106C such that cold air coming out of an air outlet 106C will reach the energy storage units 108 immediately above and below it. The first and second support parts 110A and 110B are fixed to the ventilating panel part 1063 via couplers which may be specifically designed or conventional.

As shown in FIG. 5, each storage section 107 accommodates a column or a stack of energy storage unit 300 each supported on a respective support 110. At the top of each column of energy storage units 300 there is provided a fan 108 which is supported by support 110 on the same ventilating panel 106/ventilating panel part 1061/1062/1063. The arrangement in each storage section 107 is basically identical. There is only one air conditioner 200 provided at the top of the storage area 105 above the beams 102C.

The air conditioner 200 is closer to one of the two fans 108. The fan 108 has a top inlet 108A and a side outlet 108B. The inlet 108A faces outlet of the air conditioner 200 so as to collect cold air leaving the air conditioner 200. Cold air entering the fan 108 exits via the outlet 108B. The fan 108 operates to maintain a predetermined pressure in the cold air entering the ventilating panel 106/ventilating panel part 1061/1062/1063.

With reference to FIG. 14, the outlet 108B faces and is in fluid communication with the two air inlets 106B of the ventilating panel 106/ventilating panel part 1061/1062/1063. Cold air enters the air passages 106A of the ventilating panel part 1061/1062/1063 via the air inlets 106B and exit the air passages 106A via the air outlets 106C. Cold air blows into the storage zones 113 through the two air outlets 106C that are arranged side by side at same level on the ventilating panel 106/ventilating panel part 1061/1062/1063. The air conditioner 200 and the fans 108 together ensure pressure of the cold air is sufficient for the cold air to travel to the lowermost air outlets 106C and blows into the respective storage zone 113. The arrangement ensures best heat convention at each storage zones 113.

In this embodiment, the cold air enters each storage zone 113 via the two air outlets 106C. Cold air coming out of the air outlet 106C at the rear portion 1102 of the support 110A is guided by the air guide 110C to move towards the front portion 1101. Cold air coming out of the air outlet 106C at the front portion 1101 mixes with cold air coming from the rear portion 1102. Mixture of air is then moved into the storage zone 113. As shown in FIG. 19, the energy storage unit 300 in this embodiments are equipped with fins on its outer periphery that is useful for conduction of heat away from the energy storage unit 300 by increasing the contact surface area of the energy storage unit 300 with the cold air. Cold air entering the zone 113 runs over the bottom of the supported energy storage unit 300 and the top of a lower energy storage unit 300. The cold air is guided by the fins 301 on the energy support unit 300 or is under the influence of the fins 301 to move in a preset or preferred course.

Referring back to FIGS. 3 and 4, there is a relatively substantial gap between the last supporting structure 110 of each storage sections 107A and 107B and the bottom tray 102D of the ventilating container 100. This will ensure the bottom of the last energy storage unit 300 is being properly ventilated and hot air accumulated in the storage sections 107A and 107B will be able to leave the storage space 107 without obstruction.

FIGS. 15, 16 and 17 show a second embodiment of the invention. The scale of the ventilating container 100 in the second embodiment is far more substantial than that of the first embodiment. There are two rows 114 of twelve ventilating sections 107A to 107L arranged parallel to one another and being separated by walkway 500 with a door 104 at one end. An auxiliary walkway 501 is provided at an end of the ventilating container 100 and is in communication with the walkway 500. There are two air conditioners 400, one for each row 114. The energy storage units 300 and the fans 108 are accessible from the walkway 500 such that a workman can walk into the ventilating container 100 to check on them. The auxiliary walkway 501 is in communication with the walkway 500 for workman to access the air conditioners 400. In each row 114, there are at least 13 ventilating panel parts 1061/102/1063 that partitions the storage space 105 along width of the ventilating container 100 to form 12 storage sections 107A to 107L. The ventilating panel parts 1061/1062/1063 are fixedly coupled to the frame structure 102 as in the first embodiment. In each storage section 107 there is a plurality of supports 110 that partition the storage section 107 into a plurality of storage zones 113 for supporting a plurality of energy storage units 300 and a fan 108. In each storage section 107 there is a column of energy storage units 300 each supported by respective supports 110. The uppermost support 110 in each storage section 107 supports an air blower such as a fan 108 that ventilates the entire column of energy storage units 300 in the same storage section 107. The arrangement is no different from that in the first embodiment. The ventilating container 100 has a rectangular frame structure 102 with three of the six sides being covered by openable doors 104 and the rest are covered by side walls 103. The arrangement maximizes access to the energy storage units 300. There are two air conditioners 400 each serves one row of storage sections 107A to 107L. The air conditioner is provided on the outside of the sidewall 103. The outlets 401 of the air conditioners 400 are in fluid communication with respective top inlets 108A of fans 108. The frame 102 in this embodiment does not include any beam 102C as the air conditioners 400 are supported outside of the ventilating container 100.

Along each row 114, four storage sections 107A to 107D forms a unit and are accessible by a pair of doors 104. There are three units accessible by respective pairs of doors 104. The storage space 107 is defined by the ventilating panel 106 which includes various ventilating panel parts 1061/1062/1063 that partition the storage space 17 into the four storage sections 107A to 107D. Between the units extra panels are provided. In each storage section 107A to 107L, the arrangement of the energy storage units 300 and the fan 108 are the same as that in the first embodiment. The detailed arrangements and configuration of the ventilating panel 106, ventilating panel parts 1061, 1062 1063, supports 110, holders 112, fan 108 are the same as that in the first embodiment.

With the doors 104, the walkway 500 and the auxiliary walkway 501, the energy storage units 300 are accessible on opposite sides.

FIG. 18 shows a third embodiment of the invention, which is a collection of ventilating containers 100 connected by connectors 600. The frame structure 102 is a collection of frame structures 102 of the ventilating containers 100. Each of these ventilating containers 100 has respective openable doors 104. In this embodiment, a side wall at a distal end of the ventilating container 100 is replaced with a door 104 for easy access.

With reference to FIGS. 13, 14, 19 and 20 in each of the embodiments, a guided air passage fluidly communicates the air source/air conditioner 400 or the air outlets 106C to the storage space 105/storage sessions 107/storage zones 113 for delivering air in a controlled manner to ventilate said energy storage units. The guided air passage includes the air passage 106A embedded in the ventilating panel 106/ventilating panel part 1061/1062/1063, an air path which may be a directed air path on a support 110 that extends from and transverse to the ventilating panel 106/ventilating panel part 1061/1062/1063, and a guided air pathway on at least one of said energy storage units 300.

In each embodiment, the fan 108 is in close proximity to the air conditioner 400 and is at the top of each column or stack of energy storage units 300. Cold air that enters the fan 108 from the air conditioner 400 is pushed out of the side outlet 108B of the fan 108 into the air passage 106A of the ventilating panel parts 1061, 1062, 1063. Cold air tends to sink to the bottom and with the help of the fan 108, the cold air reaches the very last energy storage unit 300 in each column/stack. The cold air leaves the ventilating panel part 1061, 1062, 1063 through the air outlets 106C into the first support part 110A of the support 110. On the first support part 110A, there is a directed air path. Cold air enters the support part 110A via the air source i.e. the air outlet 106C.

FIG. 13 shows a first embodiment of the guided air passage. The cold air (B) entering via the air outlet 106C at the rear portion 1102 is guided by the air guide 110C towards the front portion 1101 of the support 110. The cold air (A) entering via the air outlet 106C at the front portion 1101 mixes with the cold air from the rear portion 1102 and leave the first support part 110A via a same exit at the front portion 1101. The direction of the airflow on the first support part 110A is opposite that of the airflow on the energy storage unit 300. The cold air leaving the first support part 110A takes a U-turn and run over the energy storage units 300. Fins/fin-like protrusions 301 on a principal surface of the energy storage units 300 defines a guided air pathway that guides the cold air through the surfaces of the storage units 300. The guided air pathway extends immediately adjacent and over a majority of the principal surface of the energy storage unit 300 for heat dissipation. As shown in the drawings, the guided air pathway extends over the whole of the principal surface of the energy storage unit 300. Heated air leaves the energy storage unit 300 into a space behind it.

FIG. 19 shows a second embodiment of the guided air passage. In this embodiment there is only one air outlet 106C adjacent the rear portion 1102. Cold air is guided by the air guide 110C to move towards the front portion 1101 and enters the zone 113 via the front portion 1101 to the fins 301 of the energy storage units 300. The cold air then moves along the fins 301 and over the principal surface of the energy storage unit 300 to remove heat from the energy storage unit 300. The heated air leaves the energy storage unit 300 at its rear end.

Figure 20:
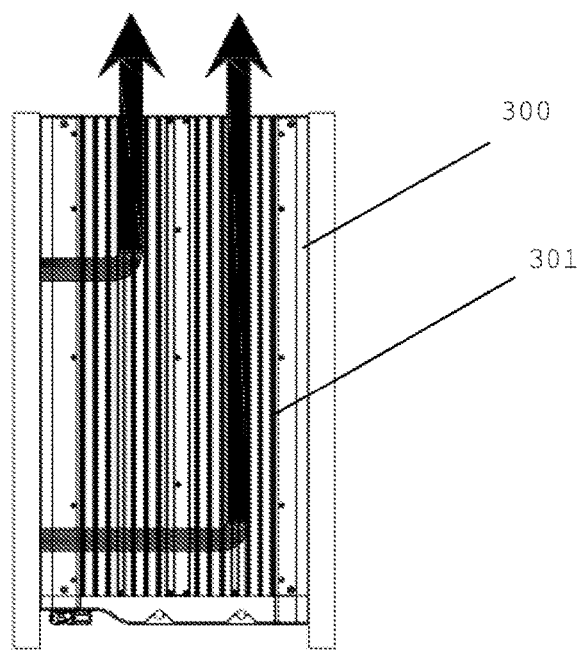
FIG. 20 is an illustrative drawing showing a third embodiment of a portion of a guided air passage which includes air path on a support and an air pathway on an energy storage unit.

FIG. 20 shows a third embodiment of the guided air passage. In this embodiment, there are two air outlets 106C adjacent the front and rear portions 1101 and 1102 respectively. The cold air leaving the air outlets 106C travels pass the support 110A into the zone 113. The cold air then moves along the fins 301 over the principal surface of the energy storage unit 300. The heated air leaves the energy storage unit 300 at the rear end of the energy storage unit 300. The arrows in FIG. 19B shows the preferred direction of airflow. The cold air is forced to move across width of the support 110A by the fan 108. The support 110A does not include an air guide 110C.

The configuration of the ventilating panel parts 1061/1062/1063 offer substantial improvements to the heat dissipation and convention within the ventilating container 100 to bring the heat away from the energy storage units 300. Fresh moving cold air is directed at each storage zone 113 by the ventilating panel parts 1061/1062/1063. The temperature difference between the cold air and the energy storage unit 300 allows effective heat convention from the energy storage unit 300 to the cold air. Fresh cold air keeps moving in to force the heated cold air out of the storage zone 113. The fins 301 on the energy storage unit 300 increase the surface area for the cold air to interact with the energy storage unit 300. This enhances heat convection and heat dissipation in the ventilating container 100. The air conditioner 400 is not required to work at high energy consumption rate to maintain the preferred heat dissipation rate. The arrangement of the fan 108 and the ventilating panel 106/ventilating panel parts 1061/1062/1063 contribute to the heat dissipation rate hence lowers the burden on the air conditioner 400.

In an alternative embodiment, the ventilating panel part 1063 may include air outlets 106C on both of two opposite sides. The second support part 110B may be provided adjacent to respective air outlets 106C such that cold air from the air outlets 106C runs pass respective second support parts 110 to reach the energy storage units 108. In other words, cold air enters the storage zone 113 from both sides via the four air outlets 106C of the partition panel part 1061 and 1063 or 1062 and 1063.

The invention has been given by way of example only, and various other modifications of and/or alterations to the described embodiment may be made by persons skilled in the art without departing from the scope of the invention as specified in the appended claims.

The invention claimed is:

1. A ventilating container for containing a plurality of energy storage units, comprising:
   a container body defining a storage area; and
   a ventilating panel securing to the container body and defining a storage space within the storage area for supporting the energy storage units;
   the ventilating panel encloses an air passage which connects an air inlet to a plurality of air outlets open to the storage space, the air outlets being distributed at designated positions on at least one side of the ventilating panel for ventilating said energy storage units,
   wherein guided air pathway is provided across the storage space, which runs in a direction transverse to direction of airflow out of the plurality of air outlets for directing the air to leave at rear end of the storage space.

2. The ventilating container as claimed in claim 1, wherein the storage space is partitioned into two or more storage sections for storing energy storage units.

3. The ventilating container as claimed in claim 1, wherein the air inlet is in fluid communication with an air blower that drives air into the air passage via the air inlet.

4. The ventilating container as claimed in claim 1, wherein the ventilating panel encloses a conduit for running of electrical wires.

5. The ventilating container as claimed in claim 4, wherein the air passage and the conduit are embedded within a filler that fills interior of the ventilating panel; optionally, the filler comprises a fire-proof material or a thermal-resistant material or a combination thereof.

6. The ventilating container as claimed in claim 1, wherein the ventilating panel is equipped with supports for removably supporting said energy storage units.

7. The ventilating container as claimed in claim 6, wherein at least one of the supports is positioned in proximity to a respective air outlet and provided on a same side of the ventilating panel as the air outlet.

8. The ventilating container as claimed in claim 7, wherein the ventilating panel includes a pair of oppositely arranged ventilating panel parts, with the air outlets on at least one of the ventilating panel parts being open to the storage space for ventilating said energy storage units in the storage space.

9. The ventilating container as claimed in claim 1, wherein at least one of supports includes first and second support parts that function as a pair for removably supporting a respective energy storage unit, with the first support part provided on one of the two ventilating panel parts and the second support part provided on the other ventilating panel part at a position corresponding to the position of the first support part.

10. The ventilating container as claimed in claim 9, wherein the first support part has an air guide that directs air exiting an adjacent air outlet to move in a preset course.

11. The ventilating container as claimed in claim 6, wherein at least one of the supports is equipped with a friction reducing member to facilitate removal of a respective energy storage unit.

12. The ventilating container as claimed in claim 1, wherein the storage space is partitioned widthwise into two or more storage sections by a further said ventilating panel part positioned between the first and second ventilating panel parts, for accommodating said energy storage units in different storage sections.

13. The ventilating container as claimed in claim 12, wherein the air inlet is in fluid communication with the fan which is provided at a top portion of at least one of the storage sections and atop a stack of energy storage units in that storage section.

14. The ventilating container as claimed in claim 12, wherein the further ventilating panel part has two opposing sides, one side being equipped with a said first support part of one support and the other side being equipped with a said second support part of an adjacent support.

15. The ventilating container as claimed in claim 14, wherein the further ventilating panel part encloses a passage way that connects at least one air inlet and a plurality of air outlets, the air outlets being located on at least one side of the further ventilating panel part at predetermined positions and are open to one of the storage sections on said one side.

16. The ventilating container as claimed in claim 6, wherein the storage space is divided heightwise by one or more said supports into storage zones for supporting respective energy storage units.

17. The ventilating container as claimed in claim 16, wherein each air outlet is open to an associated storage zone for diverting air into the storage zone.

18. The ventilating container as claimed in claim 6, wherein each of the supports extends transversely to the ventilating panel part and is positioned adjacent to an associated air outlet.

19. The ventilating container as claimed in claim 12, wherein at least one of the storage sections is divided heightwise by one or more said supports into storage zones for supporting two or more said energy storage units in the storage section.

20. The ventilating container as claimed in claim 1, wherein the container body includes a frame structure for locating the ventilating panel.

21. The ventilating container as claimed in claim 20, wherein the frame structure is equipped with a holder for holding the ventilating panel in position in the storage area; optionally, the holder includes a pair of holder parts for engaging different parts of the ventilating panel, the holder parts cooperating to hold the ventilating panel in position.

22. The ventilating container as claimed in claim 20, wherein the frame structure supports a plurality of side walls to define the storage area that contains the ventilating panel.

23. The ventilating container as claimed in claim 1, including a walkway in the storage area for accessing said energy storage units.

24. A ventilating container assembly comprising at least two of the ventilating containers as claimed in claim 1, wherein each ventilating container is equipped with a coupler for coupling with an adjacent ventilating container.

25. A ventilating container for containing a plurality of energy storage units, comprising:
   an air source;
   a container body defining a storage area in fluid communication with the air source;
   a ventilating panel securing to the container body and defining a storage space within the storage area for containing said energy storage units; and
   a guided air passage that fluidly communicates the air source to a plurality of air outlets directed at the storage space for delivering air in a controlled manner to ventilate said energy storage units;

wherein guided air pathways are provided across the storage space and run in a direction transverse to direction of airflow out of the plurality of air outlets to direct the airflow to leave at rear end of the storage space.

26. The ventilating container as claimed in claim 25, wherein the guided air passage includes an air passage embedded in the ventilating panel, an air path on a support that extends from and transverse to the ventilating panel, and a guided air pathway on at least one of said energy storage units.

27. The ventilating container as claimed in claim 25, the guided air pathway extends immediately adjacent and over a majority of a principal surface of the energy storage unit for heat dissipation.

28. The ventilating container as claimed in claim 27, wherein the energy storage unit includes at least one fin or fin-like protrusion on its principal surface to define the guided air pathway.

29. The ventilating container as claimed in claim 28, wherein air enters the air path on the support from at least two air sources, the air is guided to leave the support via a same exit.

30. The ventilating container as claimed in claim 29, wherein direction of airflow in the air path is opposite that on the principal surface of the energy storage unit.

* * * * *